UNITED STATES PATENT OFFICE.

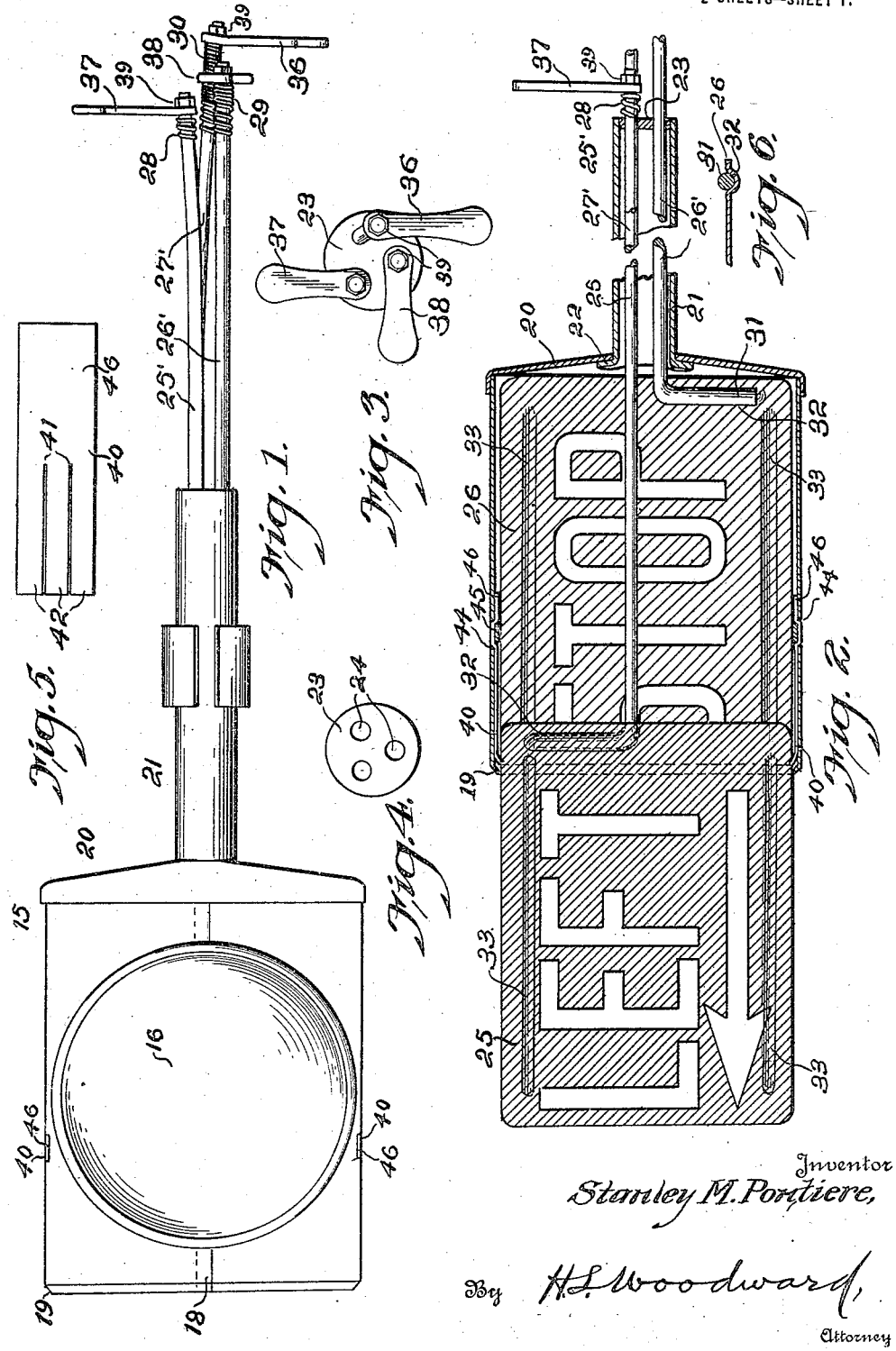

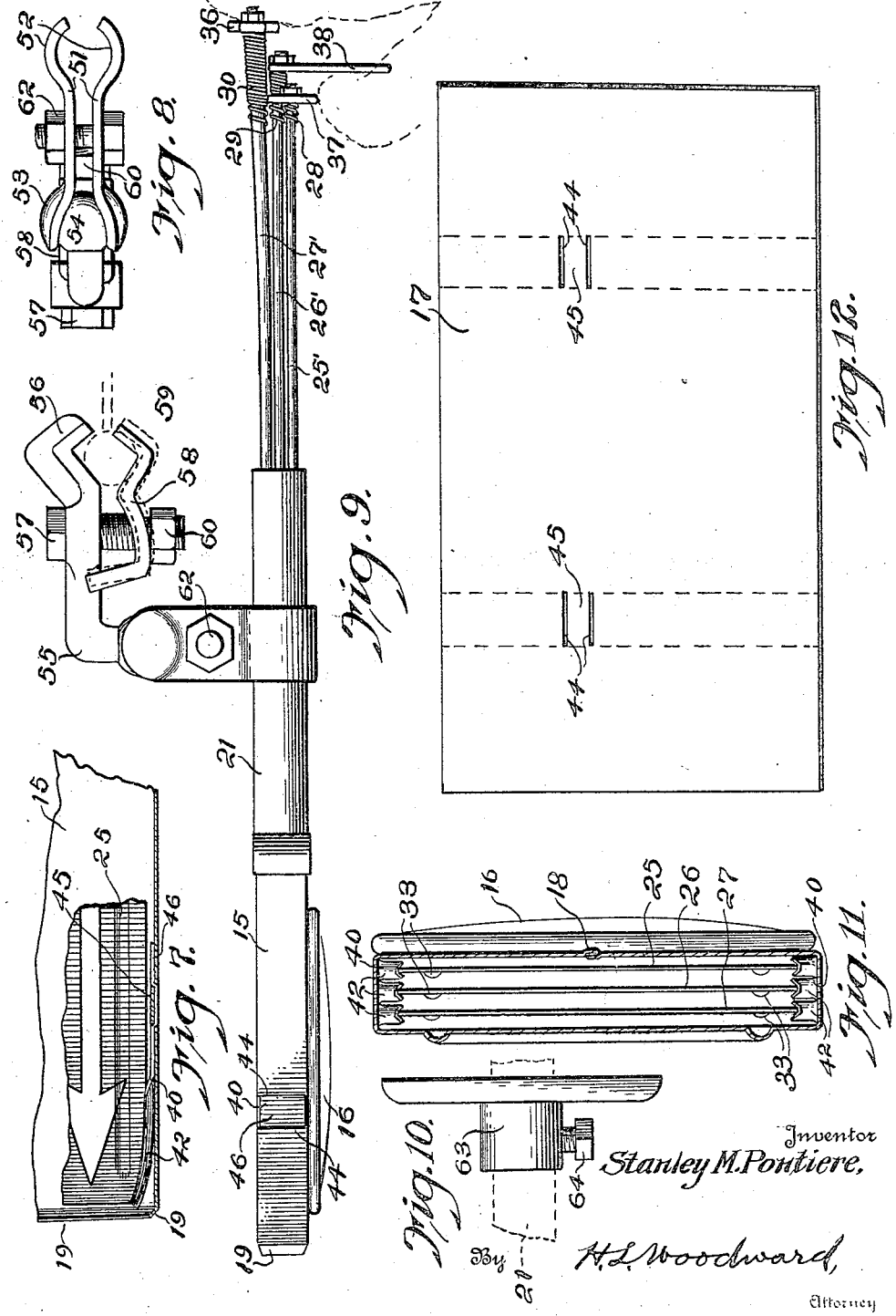

STANLEY M. PONTIERE, OF PHILADELPHIA, PENNSYLVANIA.

TRAFFIC SIGNAL FOR MOTOR VEHICLES.

1,410,502.   Specification of Letters Patent.   Patented Mar. 21, 1922.

Application filed January 4, 1921. Serial No. 435,015.

*To all whom it may concern:*

Be it known that I, STANLEY M. PONTIERE, a citizen of the United States, residing at Philadelphia, in the State of Pennsylvania, have invented certain new and useful Improvements in Traffic Signals for Motor Vehicles, of which the following is a specification.

The invention has for an object to effect improvements in signals of this character whereby their manipulation and structural details are simplified, and the device made compact and of light weight. It is an important aim to improve the manner of mounting appliances of this character. It is an important purpose of the invention to provide a device which may be used without change of its mechanical features on either open or closed cars, the latter including such vehicles as the "sedan" and "limousine" type. It is also an aim to provide in a signal of this general type a manual operating means which will tend to avoid confusion on the part of a motorist in manipulating the signal to convey knowledge to observers of the proposed course of a vehicle.

A further important purpose of the invention is to give an improved casing construction and mounting for projectable semaphore plates therein including an obviation of a tendency to rattle, and also a safety means for holding the elements against casual operation.

Certain specific improvements sought by the invention include a new and novel stop device for checking sliding elements of respective signal plates, but differing in length and at the same time cushioning the stop action; an improved manner of mounting a spring support device for signal plates in the casing; a secure manner of attaching operating rods to the signal plates; a novel structure in the casing; a novel association of the operating rods of such device with the casing mounting; a novel functioning of the operating rods whereby they may enter the casing within a very much restricted area, yet operating knob devices at their ends will be free of liability of interference; obviation of the necessity for designating the signal significance of respective operating knobs, so that they may be operated in the dark with certainty as to their significance.

Additional objects, advantages and features of invention reside in the construction, arrangement and combination of parts involved, one of the embodiments of the invention being described herein and shown in the drawings, wherein, Figure 1 is a front elevational view of the appliance.

Fig. 2 is a section in a plane parallel to the signal plates, showing one plate in operative position.

Fig. 3 is an elevational view of the control devices as viewed from the right,

Fig. 4 is an end view of the casing stem alone,

Fig. 5 is a plan of the spring support for the signal plate,

Fig. 6 is a sectional detail showing the manner of attachment of the control rods to the plates, Fig. 7 is a fragmentary sectional view showing a retracted plate and the spring mounting, Fig. 8 is a detail of the mounting bracket, Fig. 9 is a top view of the complete appliance, Fig. 10 illustrates an escutcheon mounting for the device, Fig. 11 is a cross section of the casing, with plates and spring mountings in elevation, Fig. 12 is a plan of the blank for the casing.

All of the views are two-thirds actual size of the device, as produced heretofore, excepting Figures 7 and 11, which are full size. It will be appreciated from this how readily the device is adapted to be embodied in an extremely small size, while yet being efficient in displaying signals of adequate size for the purposes intended.

There is illustrated a signal device comprising a casing 15, substantially rectangular in cross section and in front elevation, slightly longer from right to left than in height; the body portion formed integrally of sheet metal, the form of the blank for which is shown in Fig. 12. Upon the front or rearward side of the casing there is provided a convex mirror 16, the device thus serving the combined function of a rear view mirror and traffic signal. The body of the casing is formed by bending the blank 17 of Fig. 12 on the dotted lines, so as to bring its opposite end portions in overlapping relation on a horizontal line at the rearward side, and secured in any customary manner, as by a can-seam or otherwise, indicated at 18 in Figs. 1 and 11. This seam is practically concealed by the mirror 16. The left hand or outer end of the casing is open, the edge portions of the casing therearound being turned in slightly, as indicated at 19. The opposite end of the casing is closed by an end cap 20 comprising an integral stamping formed by extrusion, the end of the body of the casing fitting snugly in this cap and being soldered or otherwise secured. The cap is provided centrally with a circular opening concentric with the longitudinal axis of the casing and in this there is fitted a tubular stem 21 having a diameter equal to the width of the body of the casing before mentioned. The inner end of the stem is formed with two tongues 22, which are turned laterally to lie snugly against the end wall provided by the cap, which is slightly dished outwardly, these being soldered or brazed as desired. At the outer end of the stem a closing plate 23 is fitted therein providing with triangularly spaced openings 24, the triangle formed by these openings being inverted, there thus being one opening at the bottom and two on a horizontal line at the top, the three openings being spaced in different vertical lines. The particular arrangement specified is necessary to enable the simple system of arrangement and operation of the manual controls subsequently to be described.

In the casing there are mounted slidably for projection therefrom signal plates 25, 26, and 27 respectively, connected to which there are operating rods 25', 26' and 27', extending slidably through respective openings 24 and to a suitable distance outwardly from the end of the stem when the plates are in retracted position, to allow the necessary movement for projection of the plates by sliding movement outwardly through the open end of the casing and display of the major portion of the plate. The plates are initially positioned with their outer end edges immediately within or close to the plane of the end of the casing, and the movement permitted in operation is slightly less than the length of the plate, so that their inner end portions are retained at all times within the casing. The check means employed consists of spring elements 28, 29, and 30 on respective rods, fairly stiff springs being employed so that liability of casual movement of the plates beyond the end of the casing is obviated, and in addition the springs have only play enough to cushion the checking of the operating devices without excessive movement beyond full projected position.

In signals of this character it has been found sufficient to mark upon the plates respectively, the words "Left" "Stop" and "Right" and my invention is readily adapted to this system of marking, though any other means of distinguishing the plate or equivalent devices may be followed. The openings 24 are nearly or quite alined with respective plates, and the operating rods have their inner end portions bent at right angles as at 31, and set in recesses 32 of corresponding shape pressed in the body of the plate. The plates are also formed with pressed ribs 32, extending longitudinally adjacent the top and bottom whereby they are stiffened, permitting them to be formed of extremely thin metal. The plates 25 and 26 are shown to have depicted thereon respectively the words "Left" and "Stop," which may be depicted on both sides of the plates, so that the same signal significance will be conveyed by the plates when viewed from either side; and similarly, the plate 27 may be presumed to be marked "Right." An arrow 34 may be used in association with the marking on the first and last named plates, pointing in corresponding directions in each instance. In order that the operator may appreciate the significance of the plates controlled by any of the rods, they are made of respectively different lengths, the rod 27 being the longest and the rod 25' being the shortest. The controls on these two last named rods consists of arms 36—37, projected downwardly and upwardly, respectively, while the control for the rod 26' comprises an arm 38 which is projected horizontally forward. These arms may be broadened at their outer ends to afford comfortable finger grips. This particular arrangement enables any of the arms to be pushed inwardly until checked against the end of the stem, without liability of interference or impedence by one arm striking another. Under this arrangement, the right hand arm 36 indicates by its position that it will project a signal plate indicating a right hand turn, and the arm 37 correspondingly indicates by its position that the plate associated therewith will indicate a left hand turn. The arm 38 occupies a medial position thereby having a significance that is obtained in neither of the others, and the operator will know that it means "Stop." By reason of the length of the rods, they have considerable elasticity and it is for that reason possible to curve the rods slightly as indicated in Figures 1 and 9, so that the control elements at the outer ends will be further removed from liability of interference and the operation of the device remain unaffected. The spring check devices on the rods vary in length according to the different lengths of the rods, so that all of the plates will be checked in outward movement at the same position. The spring checks are formed of close coiled springs which normally would form positive stops, but in order to obtain a slight resilience, the first several coils at their inner ends are pulled apart sufficiently to permit the necessary play, the remainder of the spring fitting tightly upon the rod so that there will be no loose movement. For the mounting of the arms upon the rods, the rods may be reduced at their outer ends fitted in the arms in any familiar way to prevent relative rotation and secured by nuts 39.

At the top and bottom of the casing adjacent the outer end, there are provided respective identical spring support and guide devices 40, the form of the blank for which is shown in Fig. 5. This consists of a rectangular piece of resilient sheet metal having two longitudinal slits 41 formed for a suitable distance in one end providing parallel spring-fingers 42, which are pressed and given a V-shape in cross section, and curved slightly toward their concave sides as shown in Figs. 7 and 11. The springs are thus formed with grooves at one side and they are mounted with these grooves presented toward the plates, which are adjusted to engage in respective opposed fingers of the spring devices. The corners of the plates are rounded to facilitate their ready sliding movement in the casing and normally rest in the casing with their outer ends located a short distance inwardly of the extremities of the spring fingers, as shown in Fig. 7, so that the longitudinal curve of the fingers causes the ends to project slightly inward over the edge of the plates and hold them yieldingly against outward movement, the corner portion of the plate also resting upon the springs so that the plates are supported out of contact with the bottom of the casing, and, being borne upon by the opposing spring element, they are held against rattling in the casing. When the plates are projected, their upper and lower edge portions rest in the grooved extremities of the spring fingers, as indicated in Fig. 2, so that the plates are similarly held by the spring devices against rattling or loose movement when projected or retracted. In the outward movement of the plates from initial position the springs are of course, pressed upwardly or downwardly toward the top or bottom of the casing, as necessary in yielding to the outward movement of the plates.

In the mounting of the spring devices 40 it has been my custom to form slots 44 transversely of the bottom and top of the casing, pairs of slots being formed spaced longitudinally of the casing, the intervening tongue 45 being pressed out of the plane of the blank sufficiently to enable the insertion of the base or unslitted portion of the spring devices, this being done after forming of the spring tongue 42, but while the blank 17 is in flat position, and after the insertion of the spring devices the assembled parts are pressed into the shape shown in Fig. 2, so that the spring devices are securely held. The blank 17 is then formed into the casing 15 as before described.

In mounting my appliance, in order to accommodate it to various vehicles, and the requirements of various users, it is necessary for it to be adjustable vertically on open cars, and also adjustable longitudinally of the stem to bring the operating arms into convenient position, or to present the casing at the proper position to assure proper display of a signal, or to reduce liability of damage because of the distance it extends outwardly of the car. I therefore have found it necessary to construct a bracket device, illustrated in Figs. 8 and 9, which comprises two similar clamping plates 51 having opposed curved ends 52 to engage snugly around the stem 21, the opposite ends of these plates being spherically cupped for opposed engagement upon a ball member 54 having a stem 55 bent into right angled form, its outer arm being formed with an angular termination 56 and provided with a loose bolt 57 intermediately of its length engaged in a slotted clamping plate 58 having an angular portion 59 opposed to the part 56 so that the two may snugly engage upon a round object such as the rim of a wind shield, or a rod by the screwing up of a nut 60 upon the bolt 57. The inner end of the plate 58 is notched to engage upon the inner rounded part of the outer arm of the bracket member 55 slidably, so that it may readily accommodate itself to clamp objects of various sizes by adjustment of the nut 60. The plates 51 are clamped simultaneously upon the stem 21 and ball 54 by means of a bolt and nut engaged through the plates at 62.

In case the device is to be mounted upon a closed car or limousine car, an opening of a size sufficient to receive the stem 21 loosely is bored in the body of the car at a suitable point, and an escutcheon plate 63 is then mounted upon the side of the car over the opening, and after removal of the arms 36, 37, and 38, the stems are inserted through the escutcheon device and through the opening in the body, the stem 21 adjusted in the escutcheon device and secured by means of the lock screw 64 when the casing is properly positioned, after which the operating arms are again mounted upon the ends of the rods and the device is ready for use.

It is a great advantage of the device that when it is to be operated in the dark, as well as at other times, the operator can feel the grouping of the operating arms instantaneously, and immediately locate the proper one to operate without loss of time. It is a further advantage that leverage may be exerted in the hand by using one of the arms as a fulcrum, for the operation of another, after the principle illustrated in Fig. 9, where it may be seen that the thumb of the left hand of an operator may be pressed against the arm 36 at the right hand side, while the forefinger of the same hand is rested against the arm 38 at its outer side, the pressing of these arms toward each other resulting in initiating outward movement of the rod 27'. The same principle of operation may be applied to projection of any of the other plates.

What is claimed:

1. A signal device including right, left, and stop signal plates, respective operating rods extended therefrom having a triangular arrangement, being of different lengths and having operating arms extended for manipulation and positioned to clear each other in passing.

2. A signal device including right, left, and stop signal plates, respective operating rods extended therefrom of different lengths and having laterally extended operating arms, the arm of the rod to the right plate being located to the right of the other arms, and the arm of the rod to the left plate being located to the left of the other arms, all arms being movable clear of each other for projecting of the plates alternatively.

3. A signal device including normally retracted projectable signal members, and operating means therefor comprising triangularly spaced reciprocable rods having respective lateral operating arms, the one at the bottom projected horizontally, one at the back projected downwardly, and one at the front and above projected upwardly.

4. A signal device including normally retracted projectable signal members, and operating means therefor comprising reciprocable elastic rods having a set at their outer parts out of line with the direction of movement of the connected parts, for clearance of operating devices, and operating devices on their outer parts.

5. A casing for a signal of the character described comprising a body portion including top, bottom, and two joining side walls a cap member receiving one open end of the body portion and a tubular stem carried by the cap member in line with the body portion.

6. In a signal device of the character described, reciprocable plates, and upper and lower opposed guide springs grooved and receiving respective edges of the plates in their grooves, whereby each plate is guided and spring-pressed.

7. In a signal device, a guide means for a series of reciprocable plates comprising a plate of resilient metal having finger portions pressed to form grooves and alined with the path of, and receiving, respective plate elements slidably therein.

8. In a signal device of the character described, a spring element, a casing of sheet metal, parallel transverse slits being formed therein, the intervening metal between the slits being pressed from the plane of the adjacent parts, the spring element being inserted thereunder and the parts pressed flat into interlocking relation.

9. In a signal device, signal plates of sheet metal, operating rods therefor having bent ends, grooves of corresponding form being pressed in the plates and the said bent ends fitted thereto and secured.

10. In a device of the character described, a casing having a stem, a bracket having a longitudinally adjustable engagement with the stem, and a clamping device at its outer part angularly adjustable with respect to its inner part.

11. A mounting bracket comprising rod embracing plates cupped in opposition at one part, a compressing means between the cupped portions and the rod embracing portions, a ball between the cupped portions, and a mounting means thereon.

12. In a signal device a plurality of separately projectable plates and respective reciprocable rods of various lengths, operating members thereon having predetermined initial positions relatively, means to check reciprocation of the rods in one direction in the same relative positions with respect to a given plane, comprising close coiled springs of corresponding lengths fitted on the rods, and a strike surface in the path of the springs.

13. In a signal device, a plurality of separately projectable plates and respective reciprocable operating rods of various lengths, operating members thereon having predetermined initial positions relatively to each other, means to check reciprocation of the rods in the same relative positions with respect to a given plane including a strike surface, and closely coiled springs of corresponding lengths snugly fitted to the rods and having each one extremity open coiled a short distance for cushioning effect.

In testimony whereof I have affixed my signature in presence of two witnesses.

STANLEY M. PONTIERE.

Witnesses:
 JOHN A. PONTIERE,
 BENJ. F. YOUNG.